US012026266B2

(12) United States Patent
Qi

(10) Patent No.: US 12,026,266 B2
(45) Date of Patent: Jul. 2, 2024

(54) COMPUTER-IMPLEMENTED SYSTEM AND METHODS FOR PROVIDING ENCRYPTED PROTECTED DATA

(71) Applicant: NeuShield, Inc., Fremont, CA (US)

(72) Inventor: Fei Qi, Dublin, CA (US)

(73) Assignee: NeuShield, Inc., Fremont, CA (US)

( * ) Notice: Subject to any disclaimer, the term of this patent is extended or adjusted under 35 U.S.C. 154(b) by 456 days.

(21) Appl. No.: 17/557,615

(22) Filed: Dec. 21, 2021

(65) Prior Publication Data

US 2023/0195913 A1 Jun. 22, 2023

(51) Int. Cl.
G06F 21/62 (2013.01)
H04L 9/06 (2006.01)

(52) U.S. Cl.
CPC ............ *G06F 21/62* (2013.01); *H04L 9/065* (2013.01)

(58) Field of Classification Search
CPC .. G06F 21/62; G06F 21/6209; G06F 21/6218; H04L 9/065; H04L 9/0894
See application file for complete search history.

(56) References Cited

U.S. PATENT DOCUMENTS

| 9,805,210 | B2* | 10/2017 | Nord | G06F 16/00 |
| 11,829,495 | B2* | 11/2023 | Bradbury | G06F 21/53 |
| 2015/0143134 | A1* | 5/2015 | Hashimoto | H04L 9/0816 |
| | | | | 713/193 |
| 2021/0273948 | A1* | 9/2021 | Miller | H04L 63/108 |

* cited by examiner

*Primary Examiner* — Han Yang
(74) *Attorney, Agent, or Firm* — PATENTFILE, LLC; Bradley C. Fach; Steven R. Kick

(57) ABSTRACT

A computer implemented method to provide encrypted protected data in response to an unauthorized access request and unencrypted protected data in response to an authorized access request may include the following steps: receiving a first access request for accessing protected data; determining if the first access request identifies the protected data through a specified namespace; and returning an encrypted version of the protected data in response to the first access request if the first access request did not identify the protected data through the specified namespace. Optionally, the method may include the steps of: receiving a second access request to access the protected data; determining if the second access request identifies the protected data through the specified namespace; and returning an unencrypted version of the protected data in response to the second access request only if the second access request identifies the protected data through the specified namespace.

16 Claims, 7 Drawing Sheets

COMPUTER-IMPLEMENTED SYSTEM AND METHODS FOR PROVIDING ENCRYPTED PROTECTED DATA

FIELD OF THE INVENTION

This patent specification relates to the field of cyber security and computer data protection. More specifically, this patent specification relates to systems and methods for preventing exfiltration of computer data.

BACKGROUND

Hackers, unauthorized users, ransomware, or malicious software are increasingly gaining unauthorized access to sensitive and private data. Once they have access to this data, they commonly will transfer or exfiltrate the data to a remote location and use the data for personal gain or to blackmail the victim, for example by asking for a ransom. Data exfiltration can damage the reputation of a company, be costly to remediate, result in the theft or misappropriation of sensitive business information, and have detrimental consequences for individuals whose personal information may have been affected.

Therefore, a need exists for novel computer-implemented systems and methods for cyber security and computer data protection. A further need exists for novel computer-implemented systems and methods that are configured to prevent unauthorized access and exfiltration of sensitive and private data.

BRIEF SUMMARY OF THE INVENTION

According to one embodiment consistent with the principles of the invention, a computer implemented method to provide encrypted protected data in response to an unauthorized access request and unencrypted protected data in response to an authorized access request is provided. In some embodiments, the method may include the following steps: receiving a first access request for accessing protected data; determining if the first access request identifies the protected data through a specified namespace; and returning an encrypted version of the protected data in response to the first access request if the first access request did not identify the protected data through the specified namespace.

In further embodiments, the protected data may be stored in an unencrypted state and encrypted after receiving the first data access request.

In further embodiments, the protected data may be encrypted prior to receiving the first access request.

In still further embodiments, the method may include the steps of: receiving a second access request to access the protected data; determining if the second access request identifies the protected data through the specified namespace; and returning an unencrypted version of the protected data in response to the second access request only if the second access request identifies the protected data through the specified namespace.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
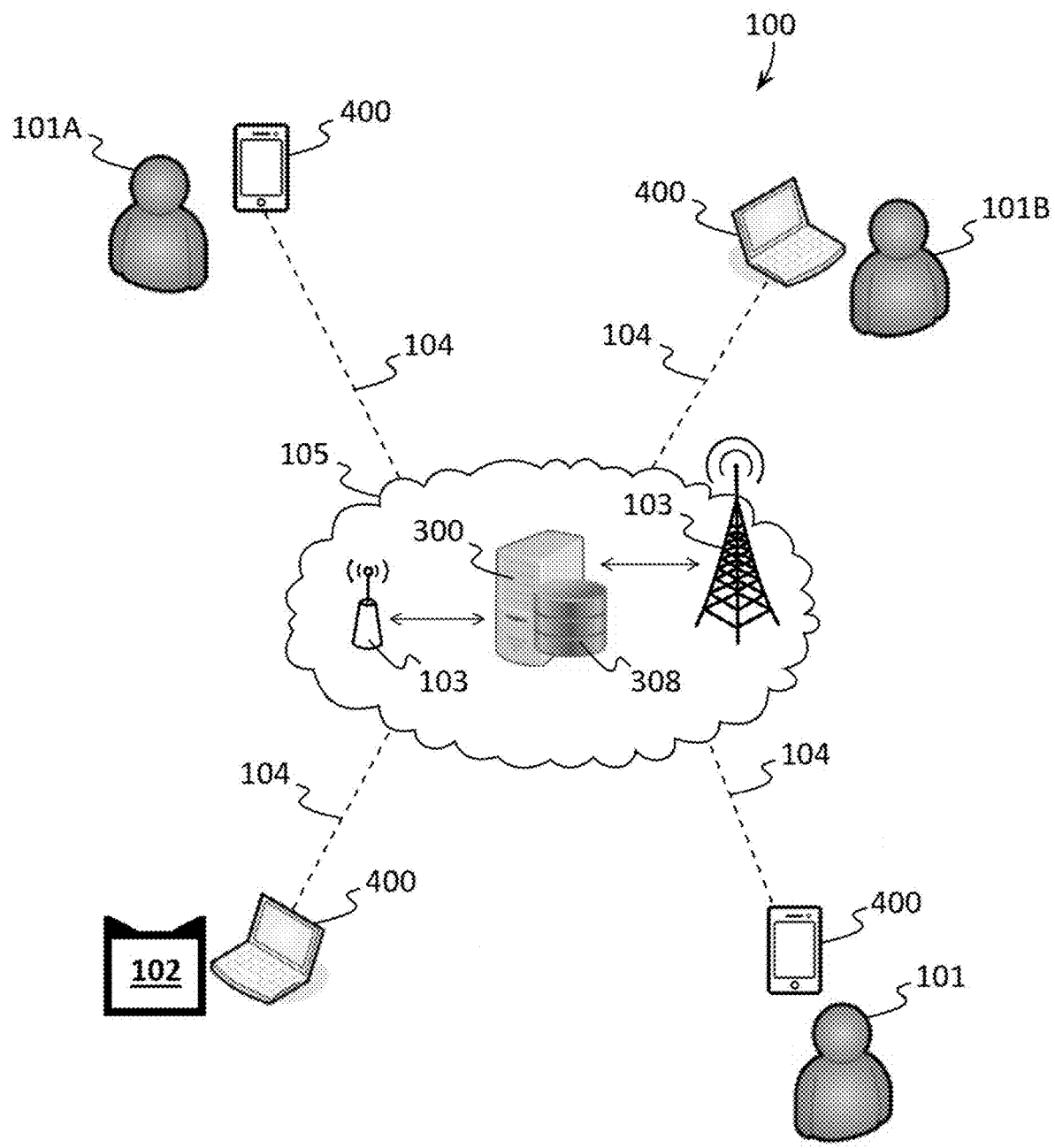
FIG. 1 depicts an illustrative example of some of the components and computer implemented methods which may be found in a computer implemented system to provide encrypted protected data according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the terms "computer" and "computing device" refer to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, servers, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigbee network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods to provide encrypted protected data such as which ay be used for preventing data exfiltration are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system to provide encrypted protected data 127 ("the system") 100 according to some embodiments is presented. The system 100 is configured to facilitate the transfer of data and information between one or more access points 103, client devices 400, and servers 300 over a data network 105, while preventing data that is protected by the system 100 from being exfiltrated, such as by hackers, data thieves, and other unauthorized users 101B, ransomware and other malicious software 102, etc. Each client device 400 may send data to and receive data from the data network 105 through a network connection 104 with an access point 103. Optionally, the system 100 may comprise one or more data stores 308 accessible by a server 300 that may contain one or more databases.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

Generally, the system 100 may be configured to return data in response to receiving an access request 121 for data. The system 100 may characterize access requests 121 as authorized access requests 122 and unauthorized access requests 123. In preferred embodiments, the system 100 may be configured to provide encrypted protected data 127 in response to an unauthorized access request 123 and unencrypted protected data 126 in response to an authorized access request 122. Typically, an authorized access request 122 may comprise an access request 121 from an authorized user 101A, the authorized user 101A comprising an individual or entity that is authorized to view, manipulate, or otherwise access the data identified in an access request 121 they have generated. An unauthorized access request 123 may comprise an access request 121 from an unauthorized user 101B or malicious software 102, the unauthorized user 101B comprising an individual or entity that is not authorized to view, manipulate, or otherwise access the data identified in an access request 121 they have generated (e.g., hackers, data thieves), and the malicious software 102 comprising data exfiltration software (e.g., ransomware). By identifying if an access request 121 is authorized or unauthorized, the system 100 may prevent data exfiltration by providing encrypted protected data 127 to a client device 400 in response to an unauthorized access request 123, such as which may be generated by an unauthorized user 101B or malicious software 102, while providing unencrypted protected data 126 to a client device 400 in response to an authorized access request 122, such as which may be generated by an authorized user 101A that generated an authorized access request 122.

Figure 2:
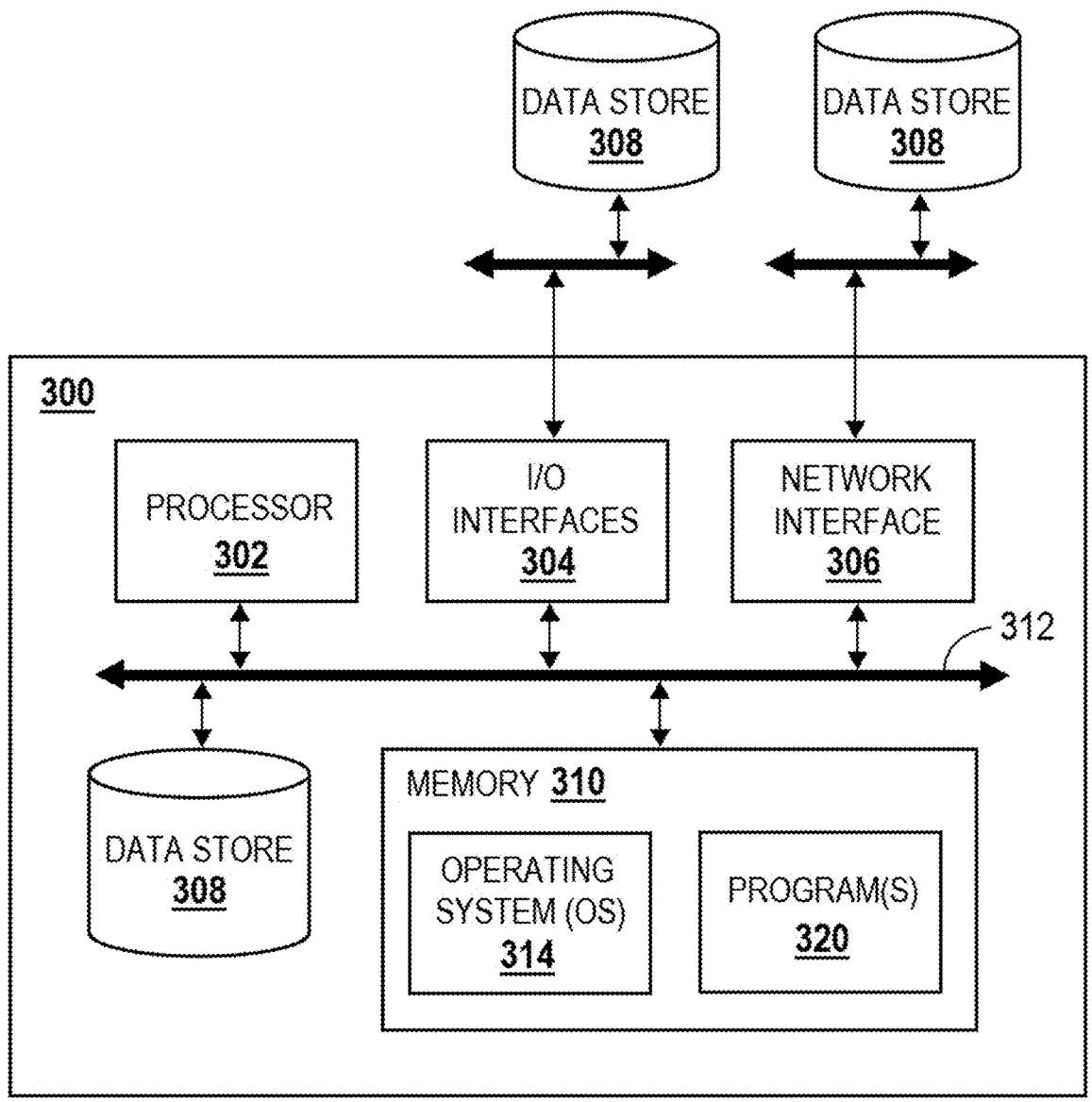
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300.

Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, WA), Solaris (available from Sun Microsystems, Inc. of Palo Alto, CA), LINUX (or another UNIX variant) (available from Red Hat of Raleigh, NC and various other vendors), Android and variants thereof (available from Google, Inc. of Mountain View, CA), Apple OS X and variants thereof (available from Apple, Inc. of Cupertino, CA), or the like. The one or more programs 320 may be configured to implement the various processes, algorithms, methods, techniques, etc. described herein.

Figure 3:
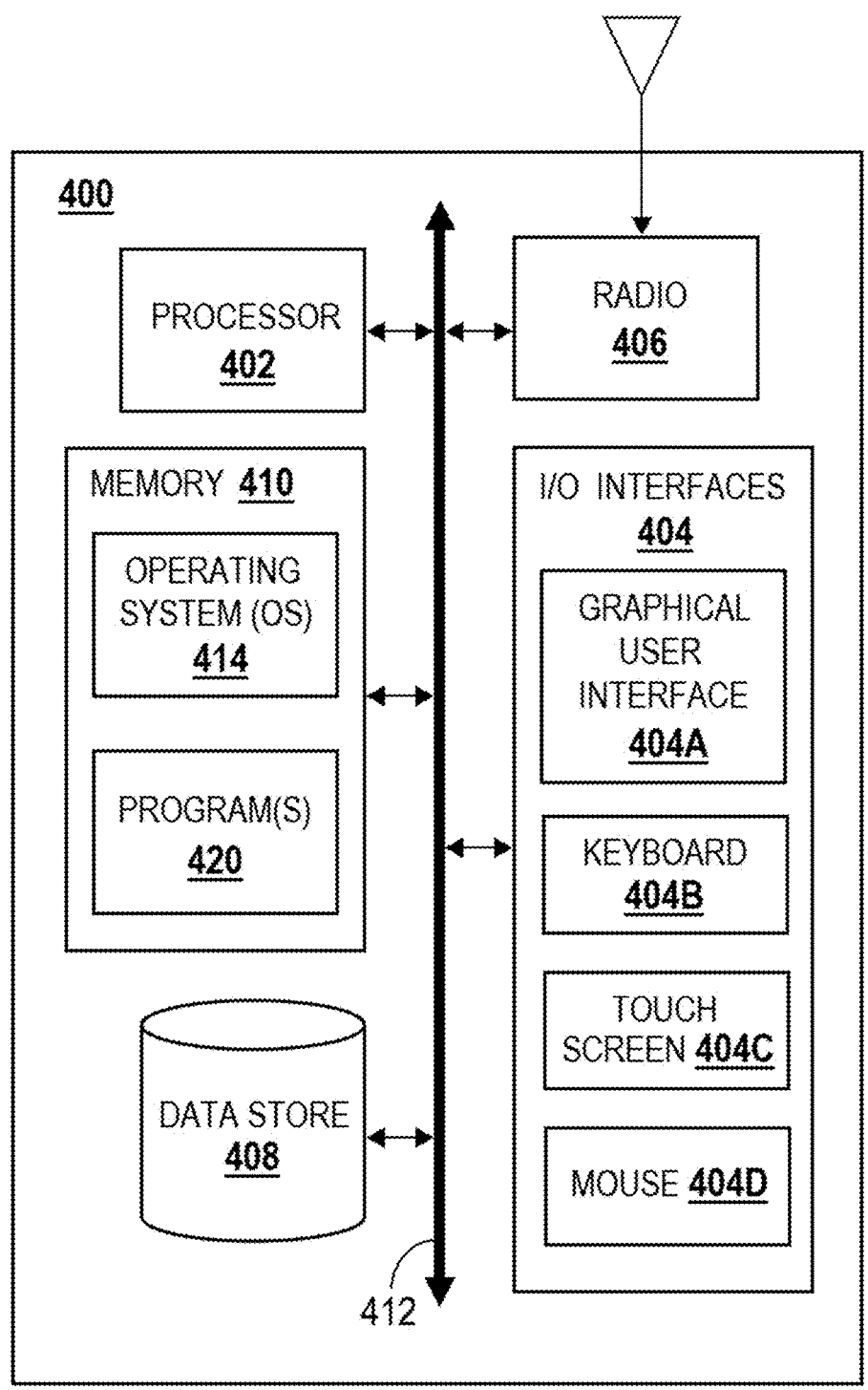
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad or keyboard 404B, touch screen 404C, camera, microphone, mouse 404D, buttons, bar code scanner, voice recognition, eye gesture, and the like. As used herein, a mouse 404D includes any hand (or other body part) operated device for positioning a cursor or performing selections and interactions with data displayed via a digital display, such as a mouse, scroll ball, scroll bar, track ball, digital pen or stylus, mouth controlled mouse, foot controlled mouse, etc. System output can be provided via a display screen, such as a liquid crystal display (LCD), light emitting diode (LED) display, touch screen display, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) 404A that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
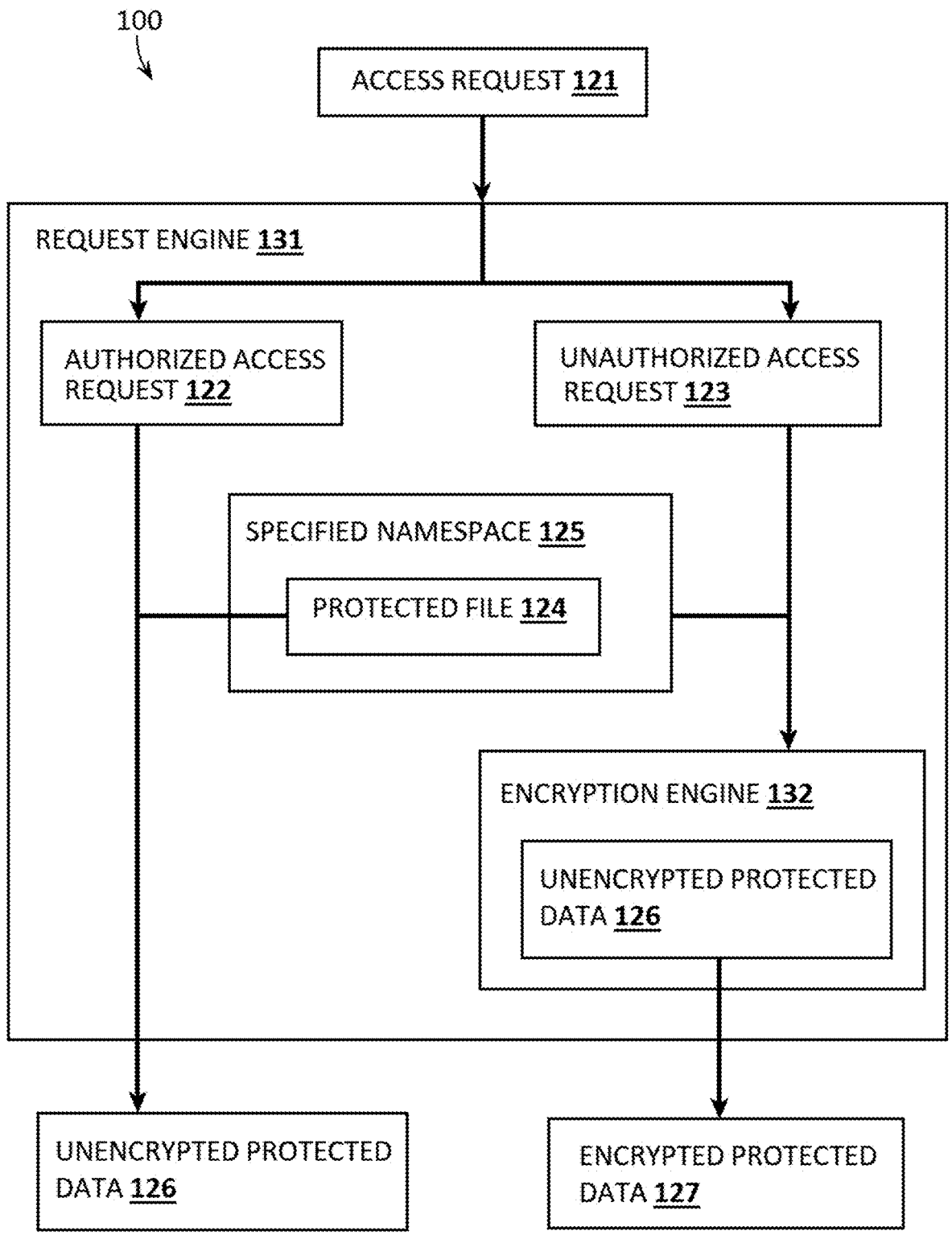
FIG. 4 depicts a schematic diagram of a computer implemented system to provide encrypted protected data which may function as software rules engines according to various embodiments described herein.

Referring now to FIG. 4 a block diagram showing a schematic diagram of the system 100 and some exemplary software rules engines and components which may optionally be configured to run on one or more servers 300 and/or client devices 400 according to various embodiments described herein are illustrated. The engines 131, 132, may be in electronic communication so that data may be readily exchanged between the engines 131, 132, and one or more engines 131, 132, may read, write, or otherwise access data of the system 100.

In some embodiments, the system 100 may include a request engine 131 and an encryption engine 132 which may be run by a processor 402 of a client device 400. In further embodiments, the system 100 may include a request engine 131 and an encryption engine 132 which may be run by a processor 302 of a server 300. In further embodiments, a request engine 131 and/or encryption engine 132 may be configured to run on one or more client devices 400 and/or servers 300 with data transferred to and from a request engine 131 and/or encryption engine 132 that may be in communication with a data store 308 through a network 105. It should be understood that the functions attributed to the engines 131, 132, described herein are exemplary in nature, and that in alternative embodiments, any function attributed to any engine 131, 132, may be performed by one or more other engines 131, 132, or any other suitable processor logic.

The system 100 may comprise one or more request engines 131. A request engine 131 may comprise or function as request logic stored in a memory 310, 410, which may be executable by the processor 302, 402, of a server 300 and/or client device 400. Generally, a request engine 131 may comprise a driver or program or module which may run in Kernel Mode and may preferably handle all the file access requests 121 in a Windows, Linux, macOS, or other operating system. In some embodiments, a request engine 131 may comprise a file system filter driver or kernel driver. For example, a request engine 131 may comprise a Microsoft Windows driver that extends or modifies the function of peripheral devices or supports a specialized device in the personal computer that is inserted into the existing Driver Stack to perform the function of handling all the file access requests 121. A request engine 131 may comprise a filter driver that can filter I/O operations for one or more file systems or file system volumes. Depending on the nature of the driver, filter can mean log, observe, modify, or even prevent. Typical applications for file system filter drivers include antivirus utilities, encryption programs, and hierarchical storage management systems.

In some embodiments, a request engine 131 may receive access requests 121 and may return data in response to each access request 121. An access request 121 may comprise a request to access data, such as which may be stored in a data store 308, 408, of a server 300 and/or client device 400. A request engine 131 may characterize or determine each access request 121 to be an authorized access request 122 or an unauthorized access request 123. In preferred embodiments, a request engine 131 may return data requested in an authorized access request 122 as unencrypted data and may return data requested in an unauthorized access request 123 as encrypted data. In further embodiments, a request engine 131 may perform one or more other functions described herein.

The system 100 may comprise one or more encryption engines 132. An encryption engine 132 may comprise or function as encryption logic stored in a memory 310, 410, which may be executable by the processor 302, 402, of a server 300 and/or client device 400. Generally, an encryption engine 132 may be configured to encrypt the data of one or more protected files 124 of the system 100. A protected file 124 may comprise a file that one or more users 101 have identified or chosen as being a file that is to be protected by the system 100. The data of a protected file 124 may be referred to as protected data. In preferred embodiments, an encryption engine 132 may generate an encrypted version of the one or more protected files 124 that are identified in an unauthorized access request 123. In some embodiments, an encryption engine 132 may dynamically generate an encrypted version of the one or more protected files 124 in an unauthorized access request 123 after the system 100 receives the unauthorized access request 123, such as by using a streaming encryption protocol or any other suitable encryption protocol. In further embodiments, an encryption engine 132 may generate an encrypted version of one or more protected files 124 before the system 100 receives an unauthorized access request 123 for the one or more protected files. In some embodiments, encrypted versions of one or more protected files 124 that are generated before receiving an access request 121 for those protected files 124 may be stored in a cached format on a client device 400 and/or server 300. In some embodiments, encrypted versions of one or more protected files 124 that are generated before receiving an access request 121 for those protected files 124 may be stored in a cache repository on a client device 400 and/or server 300. An encryption engine 132 may generate an encrypted version of a protected file 124 (generating an encrypted version of the protected data of the protected file) using any suitable encryption method or protocol, such as AES, RSA, DES, 3DES, RC5, RC6, etc. In further embodiments, an encryption engine 132 may perform one or more other functions described herein.

Figure 5:
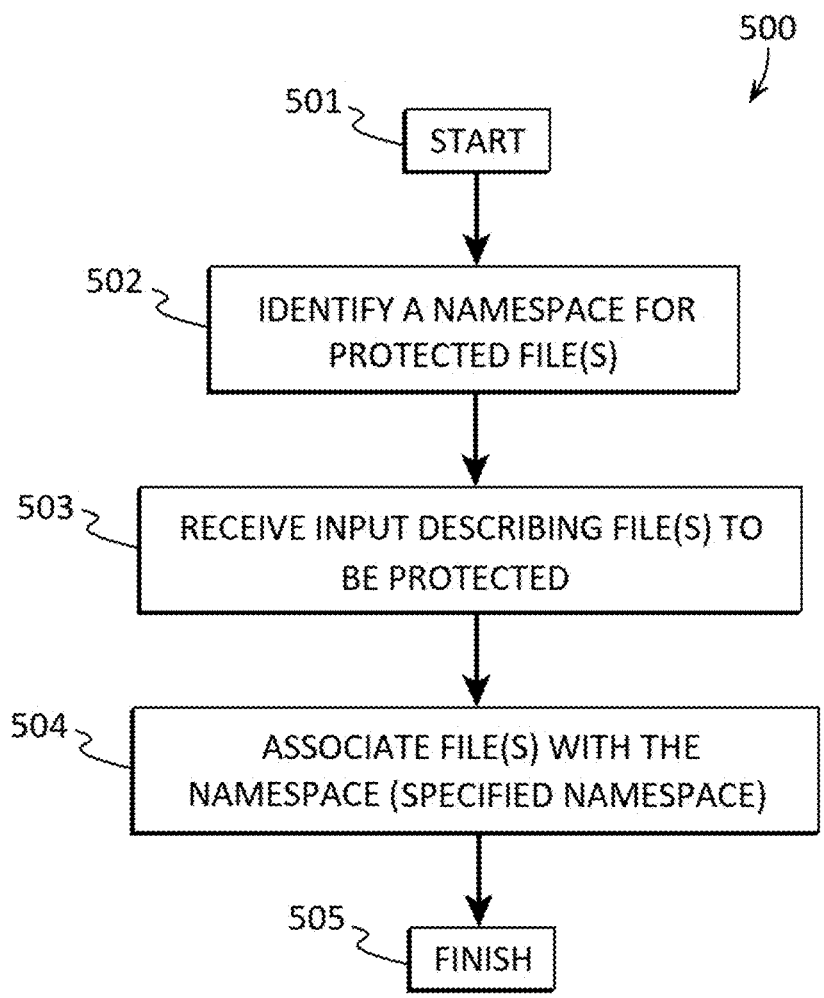
FIG. 5 illustrates a block diagram of an example of a computer-implemented method to identify a file that should be protected by the system according to various embodiments described herein.

FIG. 5 shows a block diagram of an example of a computer-implemented method to identify a file that should be protected ("the method") 500 according to various embodiments described herein. In some embodiments, the method 500 may be used to identify one or more files of a data store 308, 408, of a server 300 and/or client device 400 which the system 100 is to treat as protected files. One or more steps of the method 500 may be performed by a request engine 131 and/or encryption engine 132 which may be executed by a computing device processor, such as a processor 302 (FIG. 2) and/or a processor 402 (FIG. 3).

In some embodiments, the method 500 may start 501 and a namespace for protected files 124 may be identified in step 502. Preferably, a namespace identified in step 502 may be visible to the user 101 of the client device 400 on the graphical user interface (GUI) 404A of their client device 400 as a storage location. In computing, a namespace is a set of signs (names) that are used to identify and refer to objects of various kinds. A namespace ensures that all of a given set of objects have unique names so that they can be easily identified. Namespaces are commonly structured as hierarchies to allow reuse of names in different contexts. Namespaces are assigned a universally unique identifier (UUID), also referred to as a globally unique identifier (GUID), which is a 128-bit label used for information in computer systems. Generally, a GUID for a namespace may be hidden, such that the GUID for the namespace is only available to the graphical user interface (GUI) 404A displaying the namespace, and therefore is only associated with an access request 121 generated by a user 101 of the client device 400 having the graphical user interface (GUI) 404A displaying the namespace. In this manner, the GUID of a specified namespace 125 displayed on a graphical user interface (GUI) 404A may be hidden from unauthorized users 101B and malicious software 102.

In some embodiments, a namespace for protected files 124 may be identified by a request engine 131 creating the namespace on a client device 400 or server 300 and informing the user 101 of the client device 400 that the namespace is to be used to access files displayed in the namespace (protected files). In further embodiments, a namespace for protected files 124 may be identified by a request engine 131 by receiving user 101 input that identifies an existing namespace as a namespace that is to be used to access protected files 124 (files displayed in the namespace). Once a namespace is identified as a namespace for protected files, the request engine 131 and the system 100 may treat or identify that namespace as a specified namespace 125.

In step 503, input describing one or more files that are to be protected may be received by the request engine 131. Input describing one or more files that are to be protected may be generated by a user 101 via an I/O interface 404 of their client device 400, such as by the user 101 saving one or more files to the specified namespace 125, by the user 101 copying one or more files to the specified namespace 125, by the user 101 selecting or identifying an existing namespace in step 502 that already has files in it as a specified namespace 125, etc.

In step 504, the one or more files of step 503 may be associated with the specified namespace 125 by the request engine 131. Once a file is associated with the specified namespace 125, thereby becoming a protected file 124 of the system 100, the request engine 131 will return the data of the file in an encrypted format unless the access request 121 for that file identifies the file via the specified namespace 125.

In some embodiments, the one or more files may be associated with the specified namespace 125 by changing the identifier of the files to include the globally unique identifier (GUID) of the specified namespace 125.

After step 504, the method 500 may finish 505.

Figure 6:
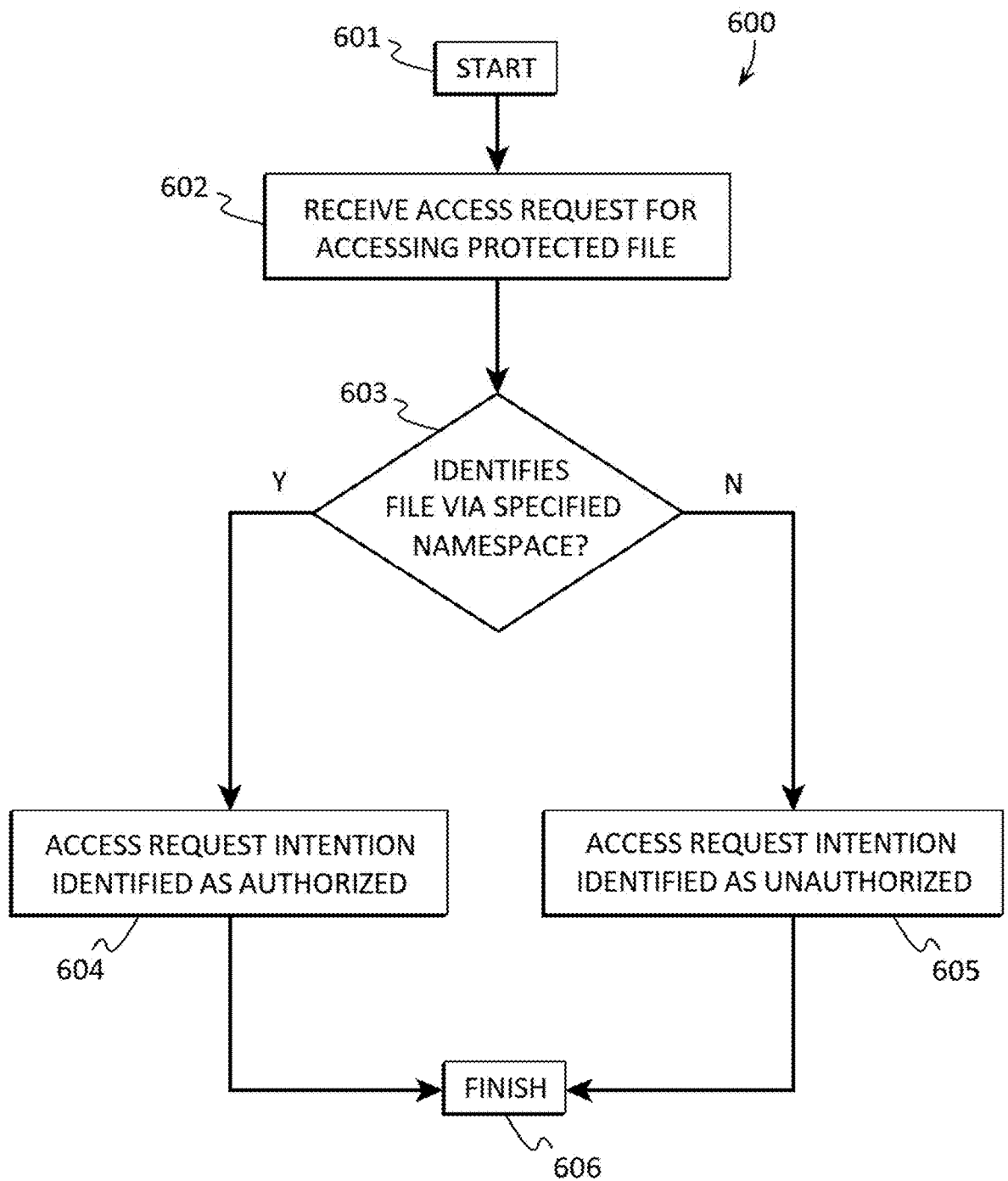
FIG. 6 shows a block diagram of an example of a computer-implemented method to identify the intention of accessing the content of a protected file and to present a separate view of the file's content transparently based on the identified intention according to various embodiments described herein.

FIG. 6 depicts a block diagram of an example of a computer-implemented method to identify the intention of accessing the content of a protected file 124 and to present a separate view of the file's content transparently based on the identified intention ("the method") 600 according to various embodiments described herein. In some embodiments, the method 600 may be used to identify or characterize an access request 121 as being authorized or unauthorized by identifying the intention of the access request 121. One or more steps of the method 600 may be performed by a request engine 131 and/or encryption engine 132 which may be executed by a computing device processor, such as a processor 302 (FIG. 2) and/or a processor 402 (FIG. 3).

In some embodiments, the method 600 may start 601 and an access request 121 for accessing a protected file 124 may be received by a request engine 131 in step 602. Generally, an access request 121 may comprise a digital request to open or view, copy, move, share, upload, or otherwise access the data of a file. As an example, a user 101 may generate an access request 121 for a file by providing input, via their client device 400, selecting to attach a file to an email. As another example, a user 101 may generate an access request 121 for a file by providing input, via their client device 400, selecting to move a file from one data store 308, 408, to another data store 308, 408.

In decision block 603, the request engine 131 may determine if the access request 121 identifies the protected file 124 via a specified namespace 125 by determining if the access request 121 includes the globally unique identifier (GUID) of a specified namespace 125. In some embodiments, an access request 121 may be provided via user input that is received from a keyboard 404B. In further embodiments, an access request 121 may be provided via user input that is received from a touch screen 404C. In further embodiments, an access request 121 may be provided via user input that is received from a mouse 404D. Generally, by using a keyboard 404B, touch screen 404C, mouse 404D, or other I/O interface 404A of a client device 400 that displays a specified namespace 125 on a graphical user interface 404A to provide user input that generates an access request 121 for a protected file 124 by selecting the protected file 124 through the displayed specified namespace 125, the generated access request 121 may include the globally unique identifier (GUID) of the specified namespace 125 which may be read by the request engine 131 so that the request engine 131 may determine that the access request 121 identifies the protected file 124 via a specified namespace 125. If the access request 121 identifies the protected file 124 via a specified namespace 125, the method 600 may proceed to step 604. If the access request 121 does not identify the protected file 124 via a specified namespace 125, the method 600 may proceed to step 605.

In step 604, the request engine 131 may identify the intention of the access request 121 as authorized. By identifying the intention of the access request 121 as authorized, the request engine 131 may process and identify the access request 121 as an authorized access request 122. The intention of an access request 121 may be identified by the request engine 131 in order to determine if the access request 121 is an authorized access request 122 or an unauthorized access request 123. Generally, an access request 121 generated by an authorized user 101A may have authorized intentions for accessing the protected file 124 identified in an access request 121 (authorized access request 122) as the authorized user 101A comprises an individual or entity that is authorized to view, manipulate, or otherwise access the data identified in an access request 121 they have generated. After step 604, the method 600 may finish 606.

In step 605, the request engine 131 may identify the intention of the access request 121 as unauthorized. By identifying the intention of the access request 121 as unauthorized, the request engine 131 may process and identify the access request 121 as an unauthorized access request 123. The intention of an access request 121 may be identified by the request engine 131 in order to determine if the access request 121 is an authorized access request 122 or an unauthorized access request 123. Generally, an access request 121 generated by an unauthorized user 101B or malicious software 102 may have unauthorized intentions for accessing the protected file 124 identified in an access request 121 (unauthorized access request 123) as an unauthorized user 101B or malicious software 102 comprises an individual or entity that is not authorized to view, manipulate, or otherwise access the data identified in an access request 121 they have generated. After step 605, the method 600 may finish 606.

Figure 7:
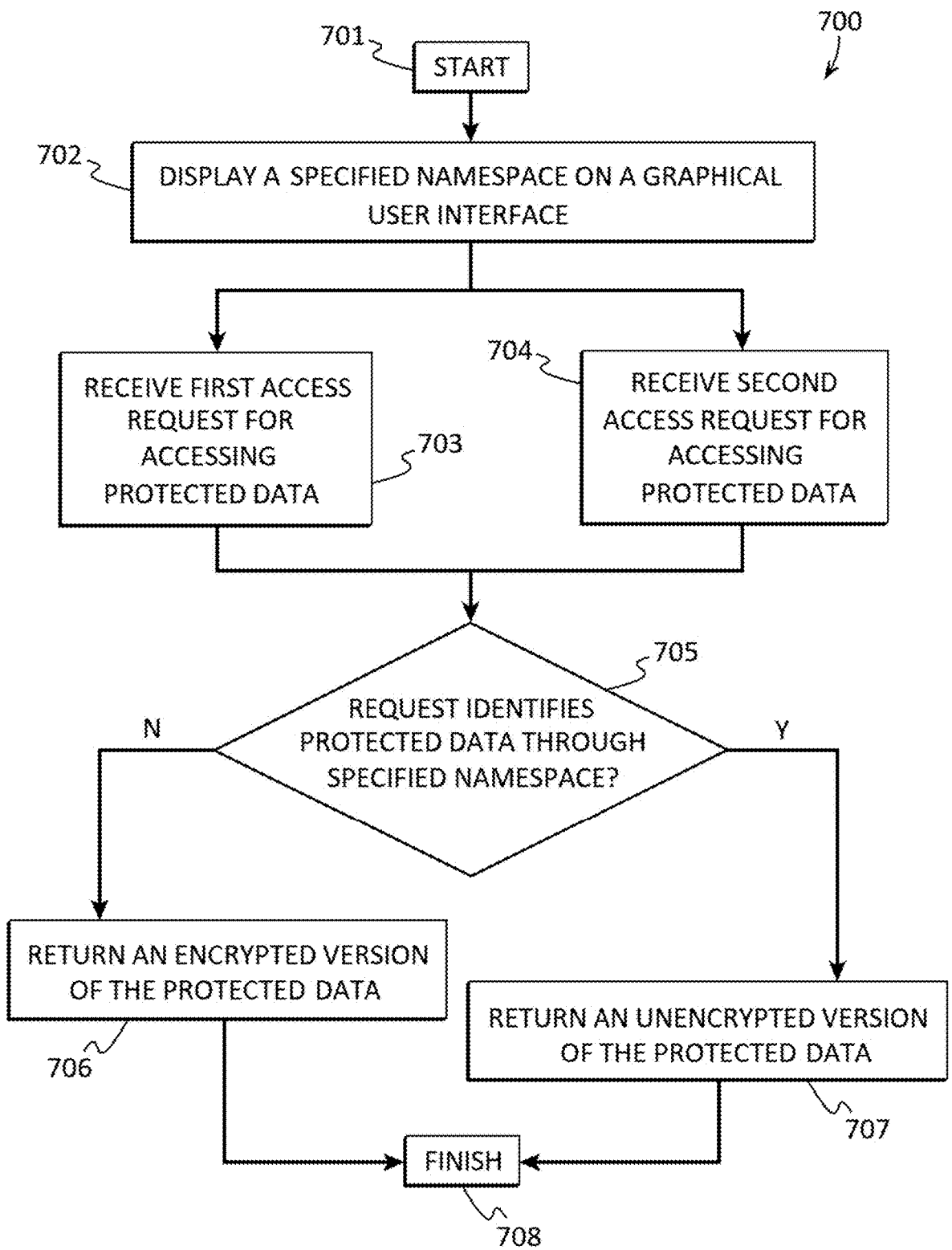
FIG. 7 depicts a block diagram of an example of a computer implemented method to provide encrypted protected data in response to an unauthorized access request and unencrypted protected data in response to an authorized access request according to various embodiments described herein.

FIG. 7 depicts a block diagram of an example of a computer-implemented method to provide encrypted protected data 127 in response to an unauthorized access request 123 and unencrypted protected data 126 in response to an authorized access request 122 ("the method") 700 according to various embodiments described herein. In some embodiments, the method 700 may be used to facilitate the transfer of data and information between one or more access points 103, client devices 400, and servers 300 over a data network 105, while preventing data that is protected by the system 100 from being exfiltrated, such as by hackers, data thieves, and other unauthorized users 101B, ransomware and other malicious software 102, etc. By providing encrypted protected data 127 in response to an unauthorized access request 123, the method 700 may prevent data that is protected by the system 100 from being exfiltrated and/or otherwise accessed by an unauthorized individual (unauthorized user 101B) or unauthorized software (malicious software 102). One or more steps of the method 700 may be performed by a request engine 131 and/or encryption engine 132 which may be executed by a computing device processor, such as a processor 302 (FIG. 2) and/or a processor 402 (FIG. 3).

In some embodiments, the method 700 may start 701 and a specified namespace 125 may be displayed on a graphical user interface (GUI) 404A of a client device 400 in step 702. In preferred embodiments, a specified namespace 125 may be displayed on a graphical user interface (GUI) 404A by being displayed as a data storage location, such as by having a name, icon, etc., by a file manager, operating system, or other user interface program 420 running on the client device 400.

In some embodiments, the method 700 may comprise step 703 and/or step 704. For example, the method 700 may be used to process at least one access request 121 so that the method 700 includes step 703 or step 704. As another example, the method 700 may be used to process at least two access requests 121, with one being determined to be authorized and the other being determined to be unauthorized, so that the method 700 includes steps 703 and step 704.

In optional step 703, a first access request 121 for accessing protected data may be received by a request engine 131. In optional step 704, a second access request 121 for accessing protected data may be received by a request engine 131. Generally, an access request 121 may comprise a digital request to open or view, copy, move, share, upload, or otherwise access the data of a file. As a first example, malicious software 102 may generate an access request 121 for a file by providing input, via their client device 400, selecting to move a file from one data store 308, 408, to another data store 308, 408, such as for data exfiltration purposes. As a second example, a user 101 may generate an access request 121 for a file by providing input, via their client device 400, selecting to open a file in a word processing program. After receiving an access request 121 in one or both of steps 703 and 704, the method 700 may proceed to decision block 705.

In decision block 705, the request engine 131 may determine if each access request 121 received by the system 100 identifies a protected file 124 via a specified namespace 125. In some embodiments, an access request 121 may be provided via user input that is received from a keyboard 404B. In further embodiments, an access request 121 may be provided via user input that is received from a touch screen 404C. In further embodiments, an access request 121 may be provided via user input that is received from a mouse 404D. Generally, by using a keyboard 404B, touch screen 404C, mouse 404D, or other I/O interface 404A of a client device 400 that displays a specified namespace 125 on a graphical user interface 404A to provide user input that generates an access request 121 for a protected file 124 by selecting the protected file 124 through the displayed specified namespace 125, the generated access request 121 may include the globally unique identifier (GUID) of the specified namespace 125 which may be read by the request engine 131 so that the request engine 131 may determine that the access request 121 identifies the protected file 124 via a specified namespace 125. If the access request 121 does not identify the protected file 124 via a specified namespace 125, the method 700 may proceed to step 706. If the access request 121 identifies the protected file 124 via a specified namespace 125, the method 700 may proceed to step 707.

In step 706, an encrypted version of the protected data may be returned in response to the access request 121 by the request engine 131 if the access request 121 did not identify the protected data through the specified namespace 125. Continuing the first example, a first access request 121 generated by the malicious software 102 for data exfiltration purposes in step 703 would not identify the protected file 124 via the specified namespace 125 since the globally unique identifier (GUID) is hidden from the unauthorized program/malicious software 102, and the request engine 131 may return an encrypted version of the protected data to the unauthorized program/malicious software 102. In some embodiments, the protected data returned in step 706 may be dynamically encrypted by an encryption engine 132. In further embodiments, the protected data may be encrypted using a streaming encryption protocol, such as AES-128, HC-256, RC4, or any other suitable encryption protocol or method. In further embodiments, an encryption engine 132 may generate an encrypted version of one or more protected files 124 before the system 100 receives an unauthorized access request 123 for the one or more protected files. In some embodiments, encrypted versions of one or more protected files 124 that are generated before receiving an access request 121 for those protected files 124 may be stored in a cached format on a client device 400 and/or server 300. In some embodiments, encrypted versions of one or more protected files 124 that are generated before receiving an access request 121 for those protected files 124 may be stored in a cache repository on a client device 400 and/or server 300. After step 706, the method 700 may finish 708.

In step 707, an unencrypted version of the protected data may be returned in response to the access request 121 if the access request 121 identifies the protected data through the specified namespace 125. In preferred embodiments, the unencrypted version of the protected data may be returned by displaying the unencrypted version of the protected data on the graphical user interface 404A of the client device 400 that was used to generate the access request 121 identifying the protected data through the specified namespace 125. Continuing the second example, a second access request 121 generated by a user 101 to open a file in a word processing program on their client device 400 in step 704 would identify the protected file 124 via the specified namespace 125 since the globally unique identifier (GUID) is included in the second access request 121 by the user 101 selecting the protected file 124 through the specified namespace 125 displayed on the GUI 404A of their client device 400, and the request engine 131 may return an unencrypted version of the protected data to the user 101 (thereby being an authorized user 101A). After step 707, the method 700 may finish 708.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented method to provide encrypted protected data in response to an unauthorized access request and unencrypted protected data in response to an authorized access request, the method comprising the following steps:
   receiving a first access request for accessing protected data;
   determining if the first access request identifies the protected data through a specified namespace; and
   returning an encrypted version of the protected data in response to the first access request if the first access request did not identify the protected data through the specified namespace, wherein the protected data is stored in an unencrypted state and the protected data is encrypted after receiving the first access request; and
   receiving a second access request to access the protected data;
   determining if the second access request identifies the protected data through the specified namespace; and
   returning an unencrypted version of the protected data in response to the second access request only if the second access request identifies the protected data through the specified namespace.

2. The computer implemented method of claim 1, wherein the second access request is provided via user input that is received from a mouse.

3. The computer implemented method of claim 1, wherein the second access request is provided via user input that is received from a touch screen.

4. The computer implemented method of claim 1, wherein the second access request is provided via user input that is received from a keyboard.

5. The computer implemented method of claim 1, wherein the unencrypted version of the protected data is returned by displaying the unencrypted version of the protected data on graphical user interface.

6. The computer implemented method of claim 1, wherein a kernel driver determines if the first access request identified the protected data through the specified namespace.

7. The computer implemented method of claim 1, wherein the protected data is dynamically encrypted.

8. The computer implemented method of claim 7, wherein the protected data is encrypted using a streaming encryption protocol.

9. The computer implemented method of claim 1, wherein the specified namespace is identified by a globally unique identifier (GUID) and the globally unique identifier (GUID) is hidden from unauthorized program.

10. A computer implemented method to provide encrypted protected data in response to an unauthorized access request and unencrypted protected data in response to an authorized access request, the method comprising the following steps:
    receiving a first access request for accessing protected data;
    determining if the first access request identifies the protected data through a specified namespace; and
    returning an encrypted version of the protected data in response to the first access request if the first access request did not identify the protected data through the specified namespace, wherein the protected data was encrypted prior to receiving the first access request; and
    receiving a second access request to access the protected data;

determining if the second access request identifies the protected data through the specified namespace; and returning an unencrypted version of the protected data in response to the second access request only if the second access request identifies the protected data through the specified namespace, wherein the specified namespace is identified by a globally unique identifier (GUID) and the globally unique identifier (GUID) is hidden from unauthorized program.

11. The computer implemented method of claim 10, wherein the second access request is provided via user input that is received from a mouse.

12. The computer implemented method of claim 10, wherein the second access request is provided via user input that is received from a touch screen.

13. The computer implemented method of claim 10, wherein the second access request is provided via user input that is received from a keyboard.

14. The computer implemented method of claim 10, wherein a kernel driver determines if the first access request identified the protected data through the specified namespace.

15. The computer implemented method of claim 10, wherein the encrypted version of the protected data is stored in a cached format.

16. The computer implemented method of claim 10, wherein the encrypted version of the protected data is stored in a cache repository.

\* \* \* \* \*